(12) United States Patent
Hassani et al.

(10) Patent No.: US 11,290,271 B2
(45) Date of Patent: Mar. 29, 2022

(54) SECURE STORAGE ENHANCEMENTS FOR AUTHENTICATION SYSTEMS

(71) Applicant: FORD GLOBAL TECHNOLOGIES, LLC, Dearborn, MI (US)

(72) Inventors: Ali Hassani, Ann Arbor, MI (US); Ryan Edwin Hanson, Livonia, MI (US); Daniel M. King, Northville, MI (US); Hamid M. Golgiri, Livonia, MI (US); Cameron Smyth, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 16/803,462

(22) Filed: Feb. 27, 2020

(65) Prior Publication Data

US 2021/0273800 A1 Sep. 2, 2021

(51) Int. Cl.
*H04L 9/08* (2006.01)
*H04L 9/32* (2006.01)
*H04L 9/06* (2006.01)

(52) U.S. Cl.
CPC .......... *H04L 9/0894* (2013.01); *H04L 9/0643* (2013.01); *H04L 9/0866* (2013.01); *H04L 9/0891* (2013.01); *H04L 9/3242* (2013.01)

(58) Field of Classification Search
CPC ... H04L 9/0894; H04L 9/0643; H04L 9/0866; H04L 9/0891; H04L 9/3242; H04L 9/14; H04L 9/3226; H04L 9/0897
See application file for complete search history.

(56) References Cited

U.S. PATENT DOCUMENTS

| | | | | |
|---|---|---|---|---|
| 9,171,140 | B2* | 10/2015 | Kespohl | G06F 21/62 |
| 9,246,686 | B1* | 1/2016 | Holland | H04L 63/12 |
| 9,843,447 | B1* | 12/2017 | Bishop | H04L 63/08 |
| 2012/0278633 | A1* | 11/2012 | Frieder | H04W 12/041 |
| | | | | 713/189 |
| 2014/0281562 | A1* | 9/2014 | Kespohl | H04W 12/068 |
| | | | | 713/184 |
| 2016/0171205 | A1* | 6/2016 | Bauer | G06F 21/64 |
| | | | | 726/26 |
| 2017/0155634 | A1* | 6/2017 | Camenisch | H04L 9/085 |
| 2019/0245842 | A1* | 8/2019 | Ferreira | H04L 63/083 |

* cited by examiner

*Primary Examiner* — J. Brant Murphy
(74) *Attorney, Agent, or Firm* — Frank L. Lollo; Brooks Kushman P.C.

(57) ABSTRACT

A secured device has a secure storage area and is configured to communicate with an authentication manager of a key server. A salt and a key identifier of a key are received to the secured device from the key server. Information corresponding to the key identifier is embedded into the salt to create a combined identifier-salt value. The combined identifier-salt value is stored in the secure storage area. The combined identifier-salt value is utilized as additional input to a hash function along with a password. The key is identified using the information corresponding to the key identifier embedded into the salt.

20 Claims, 5 Drawing Sheets

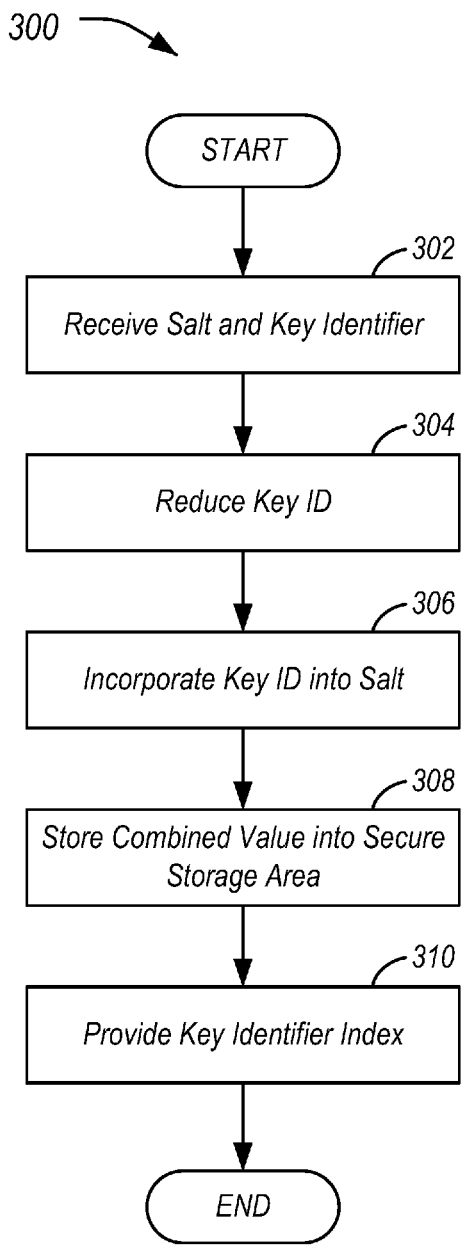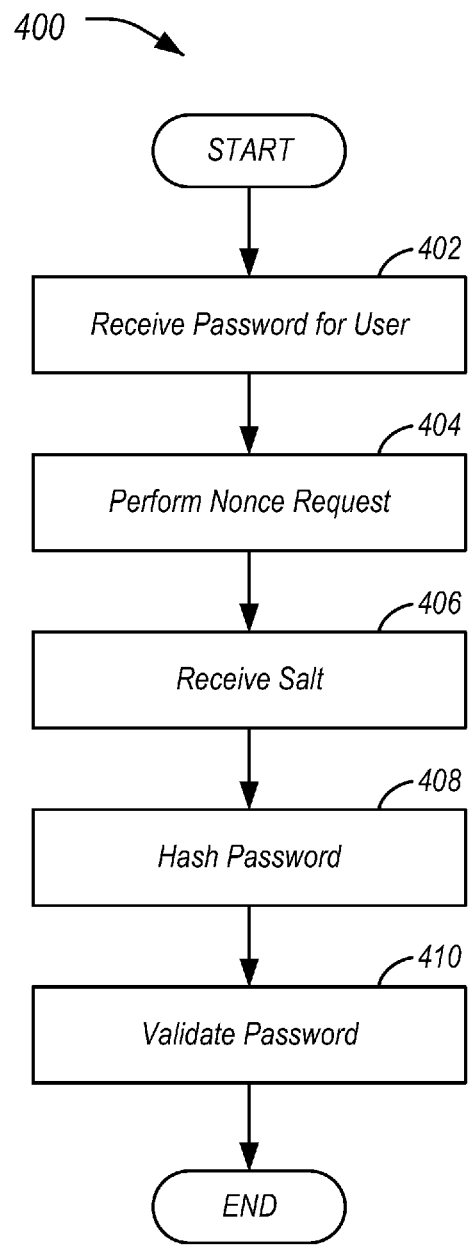
FIG. 3
FIG. 4

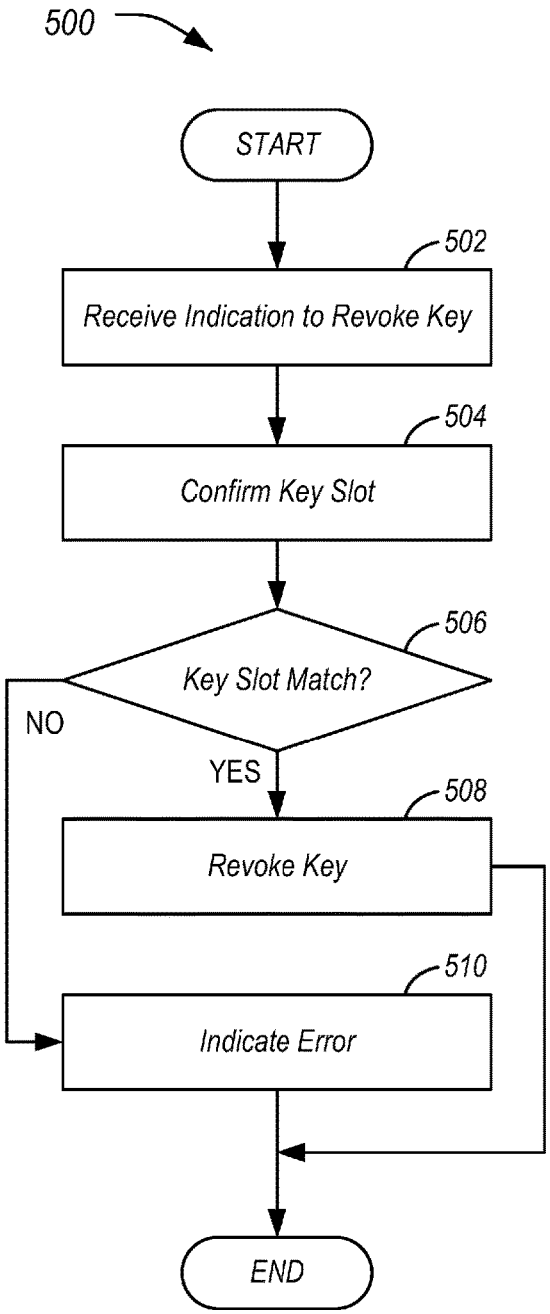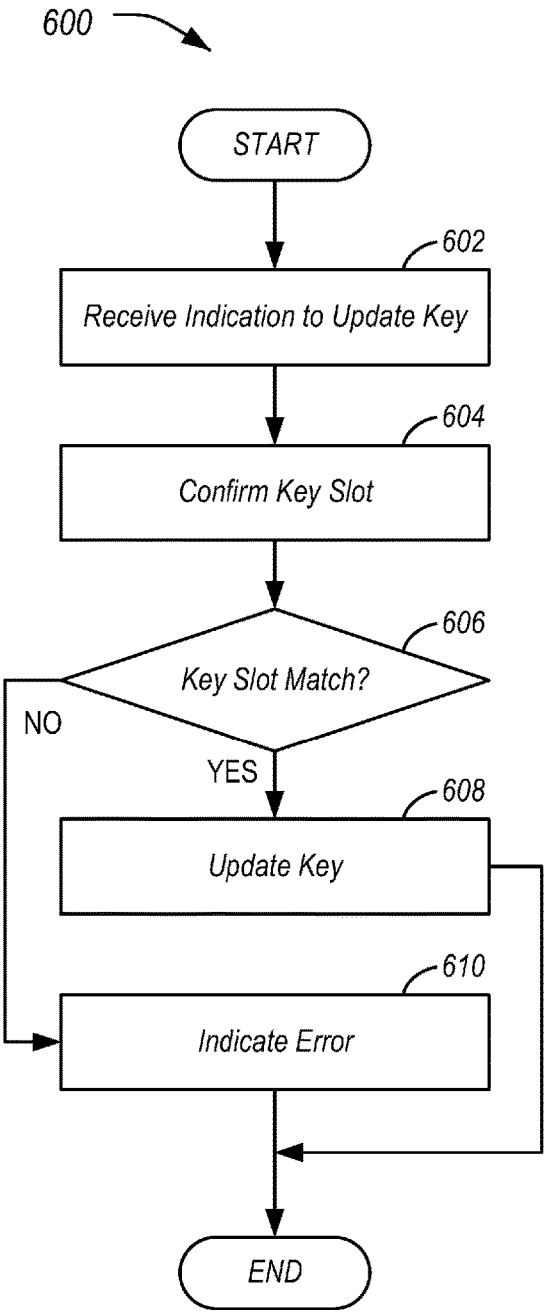
FIG. 5
FIG. 6

SECURE STORAGE ENHANCEMENTS FOR AUTHENTICATION SYSTEMS

TECHNICAL FIELD

The present disclosure generally relates to enhancements to use of secure storage space with respect to authentication systems for devices.

BACKGROUND

Personal identification numbers (PINs), passcodes, or other passwords are one mechanism that may be used to authenticate users. In one example, a user may input a predefined PIN to a keypad to gain access to a device. To validate the password, the password is provided to a hash function, which is a function that receives an input and provides a fixed-length output. The fixed-length output is then compared to a hashed version of the correct password, and access is granted if the values are a match. Hash functions for cryptography are designed to be deterministic, impractical to invert, quick to compute, and difficult to cause situations where different inputs produce the same output.

To improve the security of such systems, a salt value, which is a string of random data, may be included in the input to the hash function. For instance, the salt may be prepended or appended to the input password. By salting the passwords, if a different salt value is used for each user, then users having the same password will have unrecognizably different hash values.

Another technique to improve security is the use of nonce values. A nonce value is generally a one-time use value. The nonce may be appropriate for tasks such as initialization of a pseudorandom function or as an additional input to a cryptographic function to avoid replay attacks. For instance, a client may request a nonce value from a server and may use the nonce value as a further input to a hash function when hashing the password. This password, hashed using the nonce value, may then be provided to the server for authentication. As the nonce value may only be used once, an intermediary would be unable to capture and reuse the hashed value to gain access.

Some electronic devices include secure storage areas to ensure the secure storage of sensitive information, such as electronic keys, hashed passwords, salts, or nonce values. These such storage areas are hardware isolated from other device systems to protect against various execution or physical attacks.

SUMMARY

In one or more illustrative examples, a system for the efficient use of secure storage space includes a secured device having a secure storage area, the secured device configured to communicate with an authentication manager of a key server. The secured device is programmed to receive a salt value and a key identifier of a key from the key server; embed information corresponding to the key identifier into the salt to create a combined identifier-salt value; store the combined identifier-salt value in the secure storage area; utilize the combined identifier-salt value as additional input to a hash function along with a password; and identify the key using the information corresponding to the key identifier embedded into the salt.

In one or more illustrative examples, a method for efficient use of secure storage space is described. The method includes receiving, to a secured device having a secure storage area, a salt value and a key identifier of a key from a key server; embedding information corresponding to the key identifier into the salt to create a combined identifier-salt value; storing the combined identifier-salt value in the secure storage area; utilizing the combined identifier-salt value as additional input to a hash function along with a password; and identifying the key using the information corresponding to the key identifier embedded into the salt.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 3 illustrates an example process for the storage of the combined key identifier/salt value by the secured device;

FIG. 4 illustrates an example process for validation of access to the secured device;

FIG. 5 illustrates an example process for revoking key information from the secure storage area;

FIG. 6 illustrates an example process for updating key information in the secure storage area.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

Using a secure storage area improves security, but requires substantial additional cost compared to standard storage mechanisms. Thus, it is desirable to minimize the amount of information that is stored to the secure storage area. Several techniques are described herein that may be used to make more efficient use of space in the secure storage. In one or more examples, a key identifier may be embedded into a salt value stored to the secure store. In one or more examples, the key identifier may be refactored to reduce its size, through techniques such as by compression of the key identifier or sampling the bits of the key identifier. To further reduce storage requirements, a single nonce value may be stored per device, as opposed to one nonce per password. Moreover, additional techniques are described herein to ensure the synchronization of passwords, to address duplicate key delivery, and to manage key reset conditions.

Figure 1:
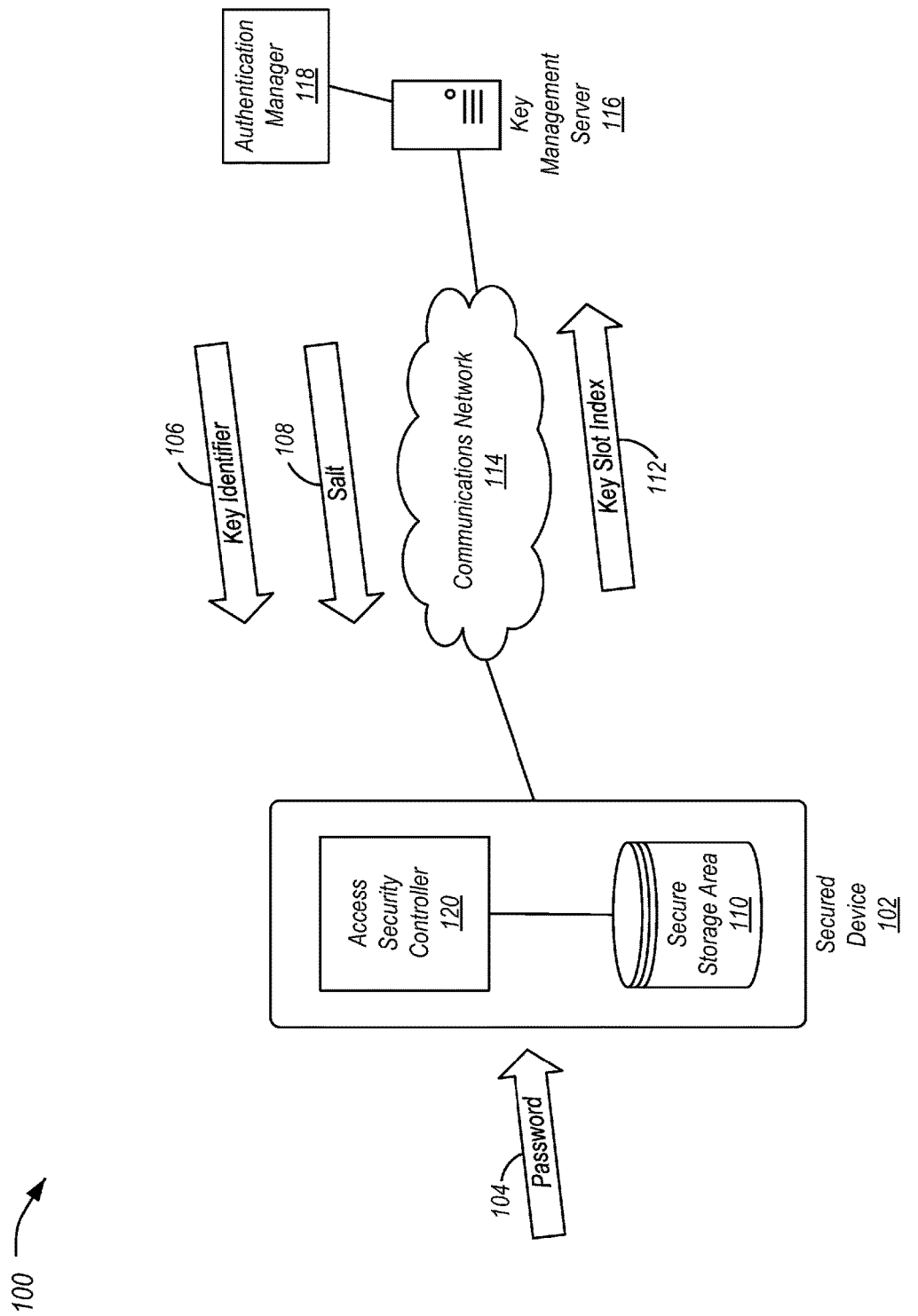
FIG. 1 illustrates an example system for the efficient use of space in secure storage area.

FIG. 1 illustrates an example system 100 for the efficient use of space in a secure storage area 110. As shown, a secured device 102 includes the secure storage area 110 in communication with an access security controller 120. The access security controller 120 is configured to validate access to the secured device 102 based on entry of credentials such as a password 104. The secured device 102 is configured to communicate over a communications network 114 with a key management server 116 hosting an authentication manager 118. The authentication manager 118 may provide key identifiers 106 and associated salt 108 values to the secured device 102, and may return key slot index 112 values to the authentication manager 118 indicative of where in the secure storage area 110 the key identifiers 106 and salts 108 are stored. It should be noted that the system 100 shown in FIG. 1 is merely an example, and systems 100 having more, fewer, or different components may be used. For instance, in an alternate example the secured device 102 and the key management server 116 communicate directly, without use of the communications network 114. In another example, the access security controller 120 and the secure storage area 110 are combined into a single component.

The secured device 102 may include any of various devices that are configured to provide controlled access to electronic data, software, and/or physical spaces or objects. As some examples, the secured device 102 may be an electronic device, such as a mobile phone, tablet computer, notebook computer, desktop PC, or a smartwatch or other wearable. As some other examples, the secured device 102 may be an appliance, e.g., having access-restricted features, such as a refrigerator or microwave. Or, the secured device 102 may be a portion of a device, such as one controller within a system including multiple controllers. As yet another set of examples, the secured device 102 may be a vehicle, such as an automobile, scooter, bicycle, or drone. As one specific vehicle example, the vehicle may be a shared vehicle to which a password is to be entered to receive access to the vehicle.

A password 104 is an identifier, such as a string of numeric or alphanumeric characters, that is entered by a user to gain access to the secured device 102. The key identifier 106 is an identifier that refers to a specific password 104 of a secured device 102. In some cases, the key identifier 106 is a value that is used by the key management server 116 to keep track of passwords 104 for use on the secured devices 102. In general, the key identifier 106 may be a counter value or arbitrary, but capable of having a sufficient number of values to make conditions where different values produce the same result unlikely. As one possible implementation, the key identifier 106 may be a random value of a predefined length, e.g., four bytes.

The salt 108 is a random value. The salt 108 may be used to add randomness to a hashing function used in the process for authentication of passwords 104. For instance, the salt may be prepended or appended to an input password 104 before the password 104 is input to the hashing function. In some cases, the salt 108 is a random value of the same length, or of at least the same length as the fixed-length output of the hashing function. By salting passwords 104 for hashing, if a different salt value is used for each user, then users having the same password 104 will still have unrecognizably different hash values.

The secure storage area 110 is a memory that is specifically configured to provide technical measures to protect access to information stored to the secure storage area 110. In many examples, the secure storage area 110 includes hardware-isolated from other device systems. These may include, for instance, a processor configured to provide write and time-delayed processing functions but not read access to the secure storage area 110, and/or protections that descry data stored to the secure storage area 110 in the event of a physical breach of the secure storage area 110 itself. These, and other security measures, may be employed to protect against various execution or physical attacks. One such example secure storage area is the Secure Enclave included in iPhone devices produced by Apple, Inc. of Cupertino, Calif. Another example is the TrustZone functionality of the microprocessors provided by Arm Holdings of Cambridge, United Kingdom.

As discussed in detail herein, the secure storage area 110 may be used to store information such as the key identifiers 106 and the salts 108. For instance, the secure storage area 110 may be allocated into a plurality of individual key slots, where each key slot is configured to store information with respect to one key identifier 106. As one non-limiting example, the secure storage area 110 may include sixty-four key slots, each for use in maintaining information for a different key identifier 106. A key slot index 112 may be used to identify into which of the key slots the information for a particular key identifier 106 is located.

The communications network 114 may be one or a combination of various wireless and/or wired networks for the communication of digitized information. In one example, the communications network 114 may be a local area network, such as an internal corporate network. In another example, the communications network 114 may be a wide-area network, such as a cellular network or the Internet.

The key management server 116 may include various types of computing apparatus including a memory on which computer-executable instructions may be maintained, where the instructions may be executable by one or more processors of the computing apparatus. As some examples, the key management server 116 may be a computer workstation, a hardware server, a desktop computer, a virtual server instance executed by a mainframe server, or some other computing system and/or device having processing capabilities and network connectivity over the communications network 114

The authentication manager 118 may be an application, service, or library included on the storage of or otherwise accessible by the key management server 116. The authentication manager 118 may be configured to perform operations such as send key identifiers 106 and salts 108 to the secured device 102 and receive key slot indices 112 from the secured device 102. The authentication manager 118 may also be configured to update key information of the secured devices 102, as well as revoke key information from the secured devices 102.

The access security controller 120 may be an application, service, or library executed by a computing apparatus of the secured device 102. In some instances, the access security controller 120 may be combined with other more general-purpose computing hardware, while in other cases the access security controller 120 may be a separate component.

Figure 2:
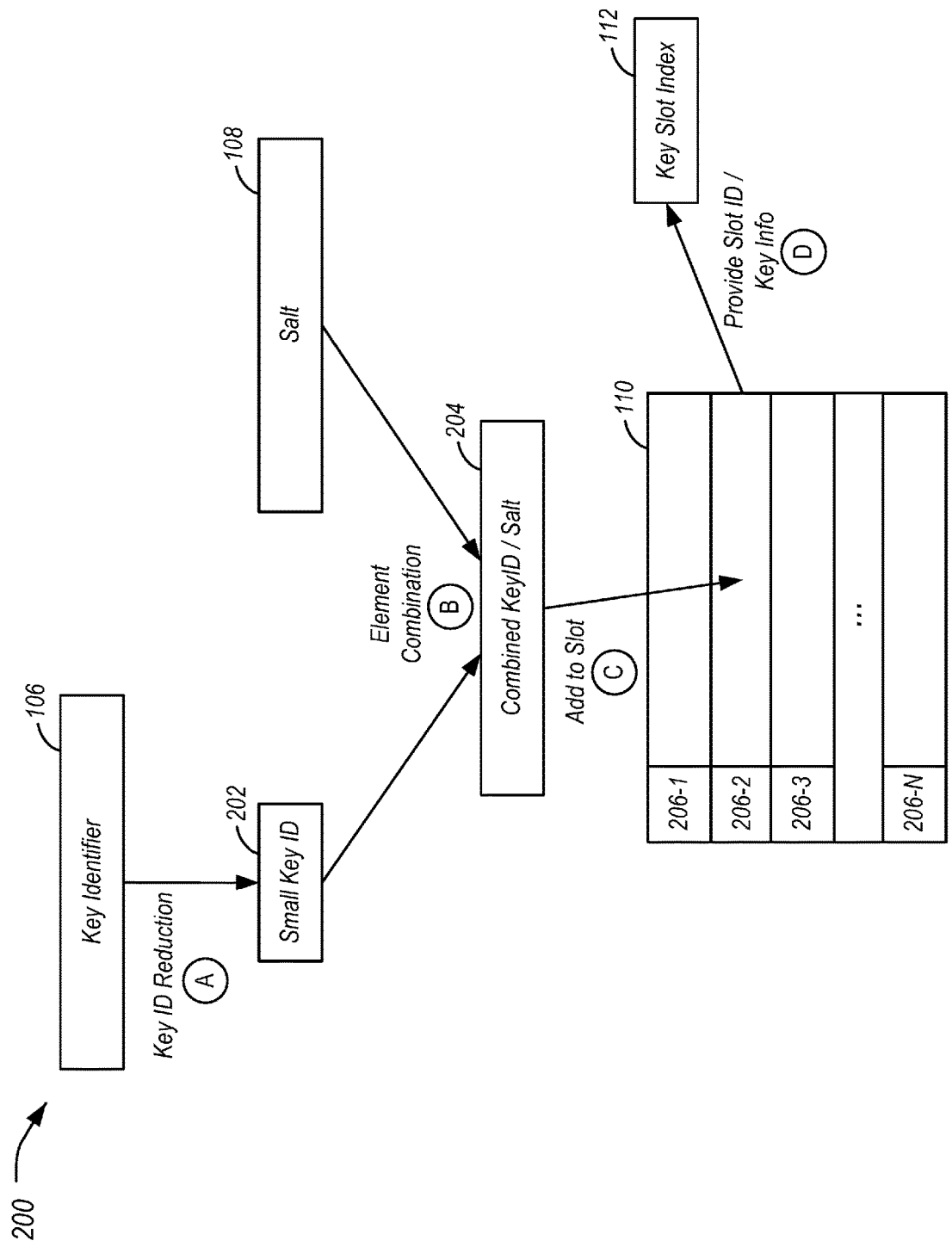
FIG. 2 illustrates an example data flow for the receipt of key information to the secured device from the authentication manager.

FIG. 2 illustrates an example data flow 200 for the receipt of key information to the secured device 102 from the authentication manager 118. In an example, the data flow 200 may be performed using the elements shown in the system 100 of FIG. 1. In general, the data flow 200 illustrates the combination of the key identifier 106 and the salt 108 into a combined key identifier/salt value 204, as well as storage of the combined key identifier/salt value 204 into a key slot 206 of the secured storage area 110. This may be triggered responsive to the secured device 102 receiving, from the authentication manager 118, a key identifier 106 and a salt 108 for a password or user account from the authentication manager 118. The key slot index 112 of the key slot 206 may further be provided back to the authentication manager 118.

FIG. 3 illustrates an example process 300 for the storage of the combined key identifier/salt value 204 by the secured device 102. As shown, in FIG. 3, and with continued reference to FIG. 2, at operation 302 the secured device 102 receives the salt 108 and the key identifier 106.

At operation 304, the secured device 102 reduces the key identifier 106. In some examples, the key identifier 106 may be embedded into the salt 108 directly. However, in many other examples, the key identifier 106 may be too great in length to be fully embedded into the salt 108, either because the key identifier 106 is larger than the salt 108, or because inclusion of the key identifier 106 renders the salt 108 ineffective for adding sufficient randomness to the hash function. Accordingly, at index (A), the length of the key identifier 106 may be reduced to produce a small key identifier 202. In one example, a lossy approach may be implemented, such that a portion of the key identifier 106 may be sampled to produce the small key identifier 202. (e.g., the first bit of each byte, or some other subset of the bits). In another example, a lossless compression approach may be used, for example, if each byte of the key identifier 106 only includes a subset of possible byte values (e.g., 64 values), then multiple bytes may be combined into fewer overall bytes. If a lossy approach is used, it should be noted that the reduction in the key identifier 106 to produce the small key identifier 202 may result in an increased likelihood in collusions of the small key identifier 202.

At operation 306, and as shown at index (B), the small key identifier 202 and the salt 108 are combined into the combined key identifier/salt value 204. This may be accomplished, in a simple example, as the placement of the small key identifier 202 at a predefined bit/byte position within the salt 108. If such an approach was used, then the combined key identifier/salt value 204 may be of the same length as the salt 108 itself, providing a savings in storage of the length of the key identifier 106 as compared to saving both values separately. In other examples, it is possible that the total length of the combined key identifier/salt value 204 is greater than that of the salt 108, but still less than the total storage requirement for storing the salt 108 and the key identifier 106 separately.

At operation 308, and as shown at index (C), the combined key identifier/salt value 204 is stored to the secure storage area 110. As shown, there are N, key slots 206 in the secure storage area 110. In an example, the secured device 102, e.g., via the access security controller 120, identifies an unused key slot 206 in the secure storage area 110 in which to place the combined key identifier/salt value 204. In one example, the secure storage area 110 includes a predefined amount of key slots (e.g., 64). The secured device 102 may maintain an index of which key slots 206 are available and which are not. Or, the secured device 102 may identify empty key slots 206 as including a predefine value indicative of emptiness.

At operation 310, and as shown at index (D), the key slot index 112 used to store the combined key identifier/salt value 204 may be provided back. For instance, the key identifier 106 and the salt 108 may be received to the secured device 102 from the authentication manager 118, and the key slot index 112 may be returned back to the authentication manager 118.

FIG. 4 illustrates an example process 400 for validation of access to the secured device 102. In an example, the process 400 may be initiated at operation 402 by the secured device 102 receiving a password for a user. In one example, the password 104 may be received via user entry to a keypad on the exterior of a vehicle. In another example, the password 104 may be received via user entry to a lock screen of a mobile device. In yet another example, the password 104 may be entered into or otherwise provided from the mobile device to the vehicle or other secured device 102. Regardless, responsive to receipt the password 104 may be provided to the access security controller 120 for processing.

At operation 404, the secure device 102 performs a nonce request. In an example, access security controller 120 of the secured device 102 requests a nonce from the secure storage area 110. For instance, the secure storage area 110 may store a single nonce that is used for the next request that is made to the secure storage area 110. The access security controller 120 may receive the nonce value, and the secure storage area 110 may receive or otherwise create a new random nonce value to use to respond to the next nonce request. A correct stored version of the password 104 for the user may also be hashed according to the nonce value for later comparison.

At operation 406, the secure device 102 receives the salt 108 from the secure storage area 110. In an example, the access security controller 120 requests the salt 108 for the user entering a password and desiring access to the secured device 102. At operation 408, the secured device 102 hashes the password 104 using the salt 108 and the nonce. This value may be provided to the secure storage area 110 for confirmation of the password 104. At operation 410, the password 104 as hashed is compared to a hash of a correct stored password 104 for the user. If the passwords 104 match, then access is granted. Otherwise, access is not granted.

FIG. 5 illustrates an example process 500 for revoking key information from the secure storage area 110. In an example, the process 500 may be initiated, as shown at operation 502, responsive to the secured device 102 receiving an indication from the authentication manager 118 that a key for a user is being revoked. This may occur, for instance, if access being available to the user is no longer desired, or simply to make room for the addition of other user credentials into the secure storage area 110. The indication to revoke the key may include the key identifier 106 for the key being revoked. The indication may additionally include the key slot index 112, which may be useful to confirm that the correct key is being revoked.

At operation 504, the secured device 102 confirms the key slot 206 includes the key to be revoked. For instance, as discussed with respect to operation 304, the key identifier 106 may be reduced into a corresponding small key identifier 202, which may be checked for as being included in the combined key identifier/salt 204 value stored at the key slot index 112. If, at operation 506, it is determined that the value is a match, control passes to operation 508 to revoke the key. Revoking the key may include various operations, such as wiping the combined key identifier/salt value 204 from the key slot 206 of the secured storage area 110, and/or indicating in an index of the key slots 206 that the key slot including the combined key identifier/salt value 204 is now free. After operation 508, the process 500 ends.

If, however, the values do not match, then control passes to operation 510. A mismatch may occur, for example, if the information stored to the secure storage area 110 has become out-of-sync with the information as managed by the authentication manager 118. The error condition may be reported by the secured device 102 to the authentication manager 118. In such a situation, the authentication manager 118 may, in one example, revoke all credentials of the secured device 102, and perform a full update of authorized users to the secured device 102 (e.g., according to the process 300). After operation 510, the process 500 ends.

FIG. 6 illustrates an example process 600 for updating key information in the secure storage area 110. The process 600 is similar in some respects to that of the process 500. However, the process 600 may be initiated, as shown at operation 602, responsive to the secured device 102 receiving an indication from the authentication manager 118 that a key for a user is being updated.

Similar to operation 502, at operation 602 the key slot 206 is confirmed. Similar to operation 504, at operation 604 it is determined whether the key slot 206 is a match. However, at operation 608, as compared to operation 508, the updated information is stored to the key slot 206 (e.g., similar to as discussed with respect to the process 300). At operation 610, similar to operation 510, an error is indicated.

Figure 7:
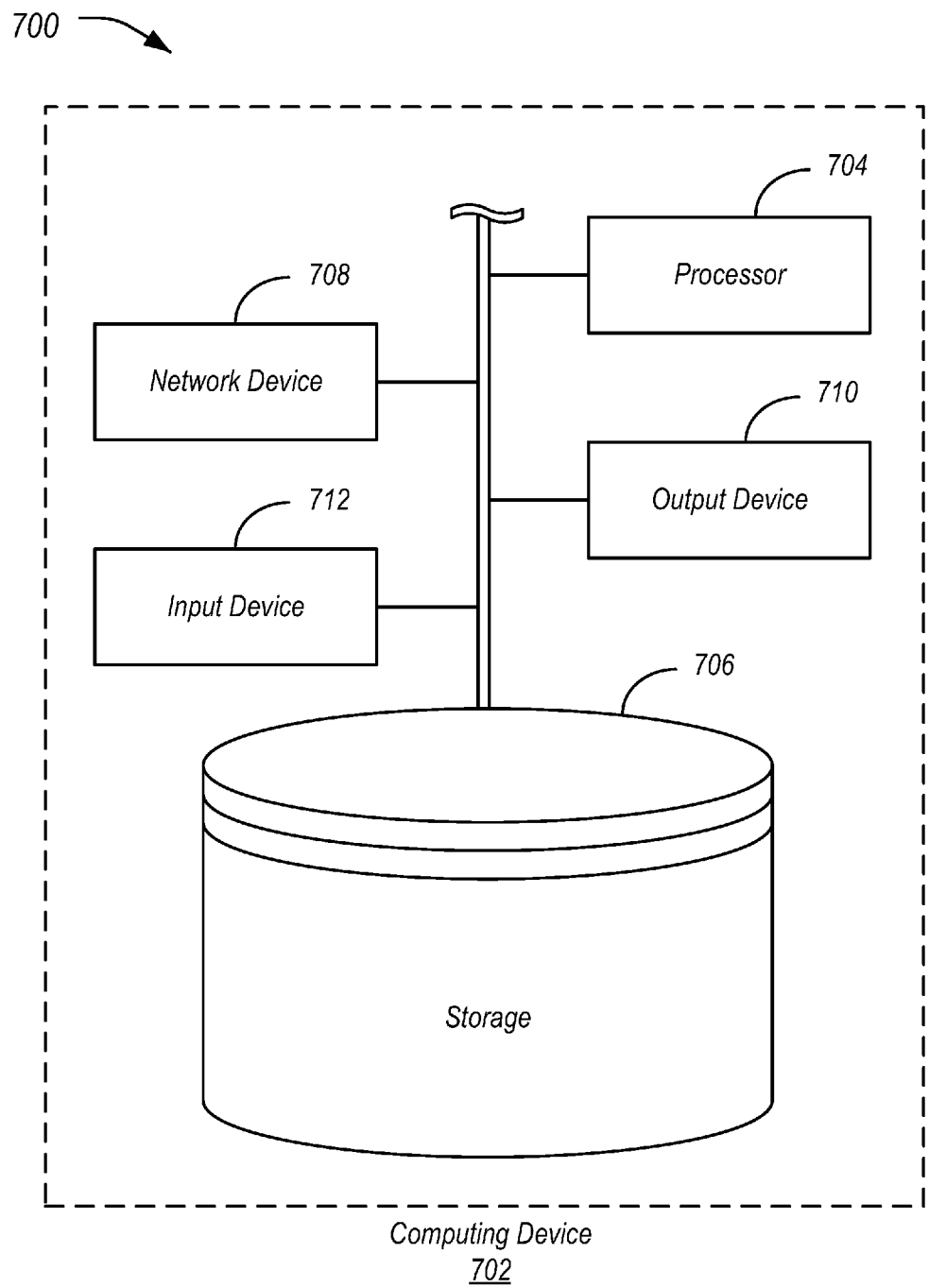
FIG. 7 illustrates an example computing device.

FIG. 7 illustrates an example computing device 700. The algorithms and/or methodologies of one or more embodiments discussed herein may be implemented using such a computing device. The computing device 700 may include memory 702 (e.g., a portion of which may be the secure storage area 110), processor 704, and non-volatile storage 706. The processor 704 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 702. The memory 702 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 706 may include one or more persistent data storage devices such as a hard drive, optical drive, tape drive, non-volatile solid-state device, cloud storage or any other device capable of persistently storing information.

The processor 704 may be configured to read into memory 702 and execute computer-executable instructions residing in program instructions 708 of the non-volatile storage 706 and embodying algorithms and/or methodologies of one or more embodiments. The program instructions 708 may include operating systems and applications. The program instructions 708 may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

Upon execution by the processor 704, the computer-executable instructions of the program instructions 708 may cause the computing device 700 to implement one or more of the algorithms and/or methodologies disclosed herein. The non-volatile storage 706 may also include data 710 supporting the functions, features, and processes of the one or more embodiments described herein. For instance, the functions and operations may include the storage and retrieval of combined key identifier/salt value 204 into key slots 206 in the secure storage area 110.

Aspects of the described approach may be useful in various situations. In one example, the aforementioned techniques may be used to optimize memory overhead for access key delivery to a controller of a vehicle acting as the secured device 102, where the vehicle has limited storage space in a hardware-secured secure storage area 110. In such an example, a key identifier 202 may be embedded into a passcode salt 108 value to create a combined key identifier/salt 204 to reduce overall storage, while still allowing for identification of duplicate key delivery as well as management of reset conditions in cases where a full reload of key information is desired. The delivered key may be a key that is used to provide entry to the vehicle through a PIN code, or to authorize a biometric challenge in comparison to a hashed value. As another possibility, the delivered key may be used to authorize transition of the vehicle into a motive mode. In the case of a biometric, the actual biometric data itself would need to be hashed when transmitted over a public bus. For instance, a fingerprint recognition module may itself only include a small memory to be low power and cost, and hashing the data would add a lot of overhead to that module.

In another example, the described approach may be used for verification of executable code or for tampering detection. For instance, it may be desirable to confirm that a sensitive algorithm, such as a facial recognition algorithm, has not been tampered with. This may be accomplished by verification of a hash of the software to be executed with a hash of the unmodified version of the software. In such an example, an algorithm identifier, e.g., as the key identifier 202 that corresponds to the executable code, may be deployed to the secured device 102, where the algorithm identifier includes a salt 108 value that may be used for generation of the hash value to confirm the identity of the software code to be run.

In yet another example, the described approach may be used for deploying the salt for hashing camera data to avoid injection attacks. This approach would reduce the overhead when deploying a cloud-based salt for each camera stream. Moreover, such an approach would enable managing security remotely, such as deploying the salt on a recurring but individual basis.

Or, the described approach may be used for key fob, TPMS, and other wireless security challenges. In such an instance, a cloud server may deploy a unique salt for each connected device for use in sensitive data transmission. The described approach may accordingly reduce the overhead versus encrypting security key validation (i.e., the hash has less overhead for transmission).

It should also be noted that with respect to secured service 102 and the key management server 116, those devices may be a client and a server in communication over a wide area network. However, in other examples, the functionality of the secured service 102 and the key management server 116 may be performed by more integrated components, such as components in a direct wired configuration, multiple controllers within a device, or even the same controller executing multiple processes or programs. As another possibility, the described approach similarly applied to vehicle-to-vehicle communications, as such scenarios may also benefit from message signing and secure communication.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for efficient use of secure storage space, comprising:
   receiving, to a secured device having a secure storage area, a salt value and a key identifier of a key from a key server;
   embedding information corresponding to the key identifier into the salt value to create a combined identifier-salt value;
   storing the combined identifier-salt value in the secure storage area;
   utilizing the combined identifier-salt value as additional input to a hash function along with a password; and
   identifying the key using the information corresponding to the key identifier embedded into the salt value.

2. The method of claim 1, further comprising sending, to the key server, a slot identifier of a key slot of the secure storage area into which the combined identifier-salt value is placed.

3. The method of claim 2, further comprising:
   receiving, from the key server, a message to revoke the key, the message including the key identifier and the slot identifier;
   confirming that the key identifier of the key slot indicated by the slot identifier matches the information corresponding to the key identifier embedded into the salt stored to the key slot;
   if the key identifier matches, revoking the key; and
   if the key identifier does not match, indicating an error condition.

4. The method of claim 2, further comprising:
   receiving, from the key server, a message to update the key, the message including the key identifier and the slot identifier;
   confirming that the key identifier of the key slot indicated by the slot identifier matches the information corresponding to the key identifier embedded into the salt stored to the key slot;
   if the key identifier matches, updating the key; and
   if the key identifier does not match, indicating an error condition.

5. The method of claim 1, further comprising reducing the key identifier into a reduced form factor key identifier by sampling a subset of bits of the key identifier to create a short key identifier, wherein the short key identifier is the information corresponding to the key identifier.

6. The method of claim 1, wherein the information corresponding to the key identifier is the key identifier in its entirety.

7. The method of claim 1, wherein the information corresponding to the key identifier is a lossless compressed version of the key identifier.

8. The method of claim 1, wherein the information corresponding to the key identifier is embedded into the salt at a predefined location in the salt.

9. The method of claim 1, further comprising:
   responsive to being reset, sending a reset flag to the key server; and
   receiving from the key server responsive to the send of the reset flag, redeployment of keys to the secured device.

10. The method of claim 1, further comprising:
    receiving a request for a password entry for a requested key identifier;
    responsive to the request, sending a generated nonce and a requested salt corresponding to the requested key identifier retrieved from the secure storage area; and
    generating a second none, to replace the generated nonce, for a next request for password entry.

11. A system for efficient use of secure storage space, comprising:
    a secured device having a secure storage area, the secured device configured to communicate with an authentication manager of a key server, the secured device programmed to:
       receive a salt and a key identifier of a key from the key server;
       embed information corresponding to the key identifier into the salt to create a combined identifier-salt value;
       store the combined identifier-salt value in the secure storage area;
       utilize the combined identifier-salt value as additional input to a hash function along with a password; and
       identify the key using the information corresponding to the key identifier embedded into the salt.

12. The system of claim 11, wherein the secured device is further programmed to send, to the key server, a slot identifier of a key slot of the secure storage area into which the combined identifier-salt value is placed.

13. The system of claim 12, wherein the secured device is further programmed to:
- receive, from the key server, a message to revoke the key, the message including the key identifier and the slot identifier;
- confirm that the key identifier of the key slot indicated by the slot identifier matches the information corresponding to the key identifier embedded into the salt stored to the key slot;
- if the key identifier matches, revoke the key; and
- if the key identifier does not match, indicate an error condition.

14. The system of claim 12, wherein the secured device is further programmed to:
- receive, from the key server, a message to update the key, the message including the key identifier and the slot identifier;
- confirm that the key identifier of the key slot indicated by the slot identifier matches the information corresponding to the key identifier embedded into the salt stored to the key slot;
- if the key identifier matches, update the key; and
- if the key identifier does not match, indicate an error condition.

15. The system of claim 11, wherein the secured device is further programmed to reduce the key identifier into a reduced form factor key identifier by sampling a subset of bits of the key identifier to create a short key identifier, wherein the short key identifier is the information corresponding to the key identifier.

16. The system of claim 11, wherein the information corresponding to the key identifier is the key identifier in its entirety.

17. The system of claim 11, wherein the information corresponding to the key identifier is a lossless compressed version of the key identifier.

18. The system of claim 11, wherein the information corresponding to the key identifier is embedded into the salt at a predefined location in the salt.

19. The system of claim 11, wherein the secured device is further programmed to:
- responsive to being reset, send a reset flag to the key server; and
- receive from the key server responsive to the send of the reset flag, redeployment of keys to the secured device.

20. The system of claim 11, wherein the secured device is further programmed to:
- receive a request for a password entry for a requested key identifier;
- responsive to the request, send a generated nonce value and a requested salt corresponding to the requested key identifier retrieved from the secure storage area; and
- generate a second nonce value, to replace the generated nonce value, for a next request for password entry.

* * * * *